US006349350B1

(12) United States Patent
Hathorn et al.

(10) Patent No.: US 6,349,350 B1
(45) Date of Patent: Feb. 19, 2002

(54) SYSTEM, METHOD, AND PROGRAM FOR HANDLING FAILED CONNECTIONS IN AN INPUT/OUTPUT (I/O) SYSTEM

(75) Inventors: Roger Gregory Hathorn; Bret Wayne Holley; James Lincoln Iskiyan, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/304,736

(22) Filed: May 4, 1999

(51) Int. Cl.$^7$ .............................................. G06F 13/00
(52) U.S. Cl. ............................... 710/36; 710/5; 710/15; 710/131; 709/104; 709/238; 711/112; 714/712
(58) Field of Search ................................ 709/102–105, 709/213–217, 232–235, 238–246; 710/5–7, 15–19, 36–42, 126–13; 711/112–114; 714/5–13, 712

(56) References Cited

U.S. PATENT DOCUMENTS

| | | | | |
|---|---|---|---|---|
| 4,396,984 A | * | 8/1983 | Videki, II | 710/38 |
| 4,733,344 A | * | 3/1988 | Watanabe et al. | 712/205 |
| 4,769,769 A | * | 9/1988 | Bolt et al. | 710/57 |
| 4,803,653 A | * | 2/1989 | Suzuki et al. | 711/148 |
| 4,807,180 A | * | 2/1989 | Takeuchi et al. | 711/112 |
| 5,241,640 A | * | 8/1993 | Hisano et al. | 710/129 |
| 5,428,796 A | * | 6/1995 | Iskiyan et al. | 710/240 |
| 5,461,720 A | | 10/1995 | Beardsley et al. | 711/112 |
| 5,493,724 A | * | 2/1996 | Cohn et al. | 710/38 |
| 5,564,023 A | * | 10/1996 | Young | 710/100 |
| 5,680,580 A | * | 10/1997 | Beardsley et al. | 710/38 |
| 5,689,728 A | * | 11/1997 | Sugimoto et al. | 710/38 |
| 5,890,217 A | * | 3/1999 | Kabemoto et al. | 711/141 |
| 6,018,792 A | * | 1/2000 | Jeddeloh et al. | 711/146 |
| 6,105,076 A | * | 8/2000 | Beardsley et al. | 710/5 |
| 6,115,768 A | * | 9/2000 | Yamamoto | 710/107 |
| 6,170,023 B1 | * | 1/2001 | Beardsley et al. | 710/36 |
| 6,185,638 B1 | * | 2/2001 | Beardsley et al. | 710/36 |

OTHER PUBLICATIONS

IBM BookManager Print Preview, Enterprise Systems Architecture/390, "Common I/O–Device Commands", Doc. No. SA22–7204–01, File No. S390–01, Apr. 9, 1992, pp1–12.

IBM BookManager Print Preview, Enterprise Systems Architecture/390, "ESCON I/O Interface", Doc. No. SA22–7202–02, File No. S390–01, Sep. 8, 1992, Chap. 1 and Chap. 7.

IBM Technical Disclosure Bulletin, "Request in Logic", vol. 37, No. 04B, Apr. 1994, pp. 519–522.

IBM BookManager Print Preview, Storage Subsystem Library, "IBM 3990 Storage Control Reference (Models 1, 2 and 3)", Doc. No. GA32–0099–06, Dec. 8, 1994, pp. 1–23.

* cited by examiner

*Primary Examiner*—Christopher B. Shin
(74) *Attorney, Agent, or Firm*—David W. Victor; Konrad Raynes Victor & Hann

(57) ABSTRACT

Disclosed is a system, method, and program for managing I/O operations transmitted from a computer system to a processing unit. The processing unit manages access to a storage device and executes the I/O operation against the storage device. The processing unit receives indication that a request to connect between the processing unit and the computer system failed. Upon receiving a subsequent I/O operation from the computer system after receiving indication that the connect request failed, the processing unit returns busy to the computer system initiating the subsequent I/O operation in response to receiving indication that the connect request failed. The connect request is retried after returning busy.

33 Claims, 5 Drawing Sheets

SYSTEM, METHOD, AND PROGRAM FOR HANDLING FAILED CONNECTIONS IN AN INPUT/OUTPUT (I/O) SYSTEM

BACKGROUND OF THE INVENTION

1. Field of the Invention

The present invention relates to a system, method, and program for processing failed connections in an input/output (I/O) system.

2. Description of the Related Art

Host computer systems may access a mass storage unit, such as a Direct Access Storage Device (DASD), which is comprised of numerous interconnected hard disk drives (HDDs) that form a single storage space. In such systems, a storage controller would manage input/output operations between the host systems and the DASD. Examples of storage controllers include the International Business Machines ("IBM") 3990 Storage Controller, described in IBM publication, "IBM 3990 Storage Control Reference (Models 1, 2, and 3), IBM document no. GA32-0099-06 (Copyright IBM Corp. 1988, 1994), which publication is incorporated herein by reference in its entirety.

FIG. 1 illustrates host systems 4a, b, c that communicate to a storage controller 6 via an Enterprise Systems Connection (ESCON®) interface 8. (ESCON is a registered trademark of IBM.) The ESCON 8 interface provides an optical fibre link and one or more dynamic switches between the host systems and the storage controller 6. The storage controller 6 manages input/output operations between the DASD 10 and the host systems 4a, b, c. The host systems 4a, b, c each include a channel subsystem to control I/O operations initiated by the host systems 4a, b, c and directed to the DASD 10 and storage controller 6. The channel subsystems include one or more channels that provide a connection through which an I/O command may be delivered from the host system 4a, b, c to the storage controller 6. The channels and subchannel architecture provide the host system 4a, b, c the addressing information needed to access logical subsystems (LSSs) within the DASD 10. The channel subsystem and channel architecture in the host systems 4a, b, c are described in IBM publication, "Enterprise Systems Architecture/390: Principles of Operation," IBM document no. SA22-7201-04 (Copyright IBM Corp. 1990, 1991, 1993, 1994, 1996, 1997), which publication is incorporated herein by reference in its entirety.

The ESCON interface 8 provides ports through which the host systems 4a, b, c and storage controller 6 connect. The ESCON interface 8 provides the physical and logical connection between a channel within a host system 4a, b, c and the storage controller 6. The ESCON interface 8 provides a link, which is the transmission medium for a serial I/O interface, that is a point-to-point pair of conductors (optical fibers) that physically interconnect a storage controller 6 and a channel, a channel and a dynamic switch, a storage controller 6 and a dynamic switch, or, in some cases, a dynamic switch and another dynamic switch. The ESCON interface 8 and interaction with the channel architecture in the host systems 4a, b, c is described in IBM publication "ESCON I/O Interface," IBM document no. SA22-7202-02 (Copyright IBM Corp. 1990, 1991, 1992), which publication is incorporated herein by reference in its entirety.

ESCON provides a frame protocol for communications between the storage controller 6 and channels in the host systems 4a, b, c. After the storage controller 6 receives a request for data from a channel in a host system 4a, b, c, the storage controller 6 disconnects from the channel to free-up the channel and ESCON interface 8 links while the storage controller 6 retrieves the requested data from the DASD 10, or otherwise executes the I/O operation. After the storage controller 6 retrieves the requested data from the DASD 10, the storage controller 6 will then attempt to reconnect to the host system 4a, b, c via the channel from which the read request was initiated or via another channel if the host 4a, b, c provides for dynamic path reconnection. With dynamic path reconnection, the storage controller 6 may reconnect to the host system 4a, b, c via any available channel path between the storage controller 6 and host system 4a, b, c. The storage controller 6 reconnects to the host system 4a, b, c to present the status of the I/O operation and return requested data for a read operation. However, if the there is no available channel path for the storage controller 6 to reconnect to the host system 4a, b, c, then the host channel 35 may return a link level busy to the storage controller 6 indicating that the reconnect cannot be retried at the moment. If the storage controller 6 attempts to reconnect through an ESCON interface 8 which does not have an available link to provide between the channels of the host system 4a, b, c and the storage controller 6, then the ESCON interface 8 will return a port busy frame to the storage controller 6 indicating that the ESCON interface 8 ports through which the storage controller 6 may reconnect to the host system 4a, b, c are busy. In current systems, a pending I/O operation has priority over reconnect requests.

After receiving a link level busy or port busy message in response to the reconnect message, the storage controller 6 will retry the reconnect command at a later time. The storage controller 6 may time-out after unsuccessfully retrying the reconnect command for a period of time. Further, if the host system 4a, b, c does not receive status information on the I/O operation for a period of time, then the I/O command may fail at the host system 4a, b, c end with a channel path time out. In such case, after the time out, the host system 4a, b, c may retry the I/O operation.

The host systems 4a, b, c may initiate enough I/O operations to consume all available channels and ESCON port resources. In such case, the storage controller 6 may not be able to reconnect and provide status as all host system 4a, b, c channels and ESCON interface 8 ports capable of providing a reconnection path are unavailable.

There is thus a need in the art for an improved method and system for managing I/O operations between host systems 4a, b, c and storage controllers 6 to prevent the I/O operation from timing out because of the inability of the storage controller 6 to reconnect to the host system 4a, b, c.

SUMMARY OF THE PREFERRED EMBODIMENTS

To overcome the limitations in the prior art described above, preferred embodiments disclose a system, method, and program for managing I/O operations transmitted from a computer system to a processing unit. The processing unit manages access to a storage device and executes the I/O operation against the storage device. The processing unit receives indication that a request to connect between the processing unit and the computer system failed. Upon receiving a subsequent I/O operation after receiving indication that the connect request failed, the processing unit returns busy to the computer system initiating the subsequent I/O operation in response to receiving indication that the connect request failed. The connect request is retried after returning busy.

In further embodiments, the processing unit queues information on the failed connect request in a first queue after receiving indication that the connect request failed. The processing unit further queues information on the busy returned to the computer system in a second queue. The processing unit accesses information on a failed connect request from the first queue and retries the accessed failed connect request. The processing unit determines whether the retried connect request succeeded and returns a busy end status to the computer system after determining that the retried connect request succeeded. The computer system retries the subsequent I/O operation which was suspended as a result of the returned busy.

In still further embodiments, the processing unit increments a counter after queuing information on the failed connect request in the first queue. The processing unit determines whether the counter exceeds a predetermined value before returning busy to the computer system initiating the subsequent I/O operation. Busy is returned in response to subsequent I/O operations if the counter exceeds the predetermined value.

In yet further embodiments, the computer system and processing unit disconnect after the processing unit receives an I/O operation. The processing unit reconnects with the computer system to present status on the disconnected I/O operation after processing the disconnected I/O operation. In such embodiments, the failed connect requests queued in the first queue are requests by the processing unit to reconnect to the computer system to present status on previously disconnected I/O operations.

With preferred embodiments, the storage controller may return busy messages to host systems initiating I/O operations to reduce I/O traffic in order to make connection resources, such as channel paths and ESCON interface ports and links, available. Increased availability of such connection resources will permit the storage controller to reconnect to a host system to present status on a completed I/O operation that was previously disconnected. Preferred embodiments, determine a threshold number of failed reconnects that occur before the storage controller returns busy to inhibit new I/O operations. The storage controller may cease returning busy after a reconnect succeeds. In this way, preferred embodiments provide a mechanism to regulate I/O traffic to reduce the occurrence of reconnection operations timing out because of a lack of channel and other connection resources resulting from newly initiated I/O operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

I/O System Architecture

Figure 1:
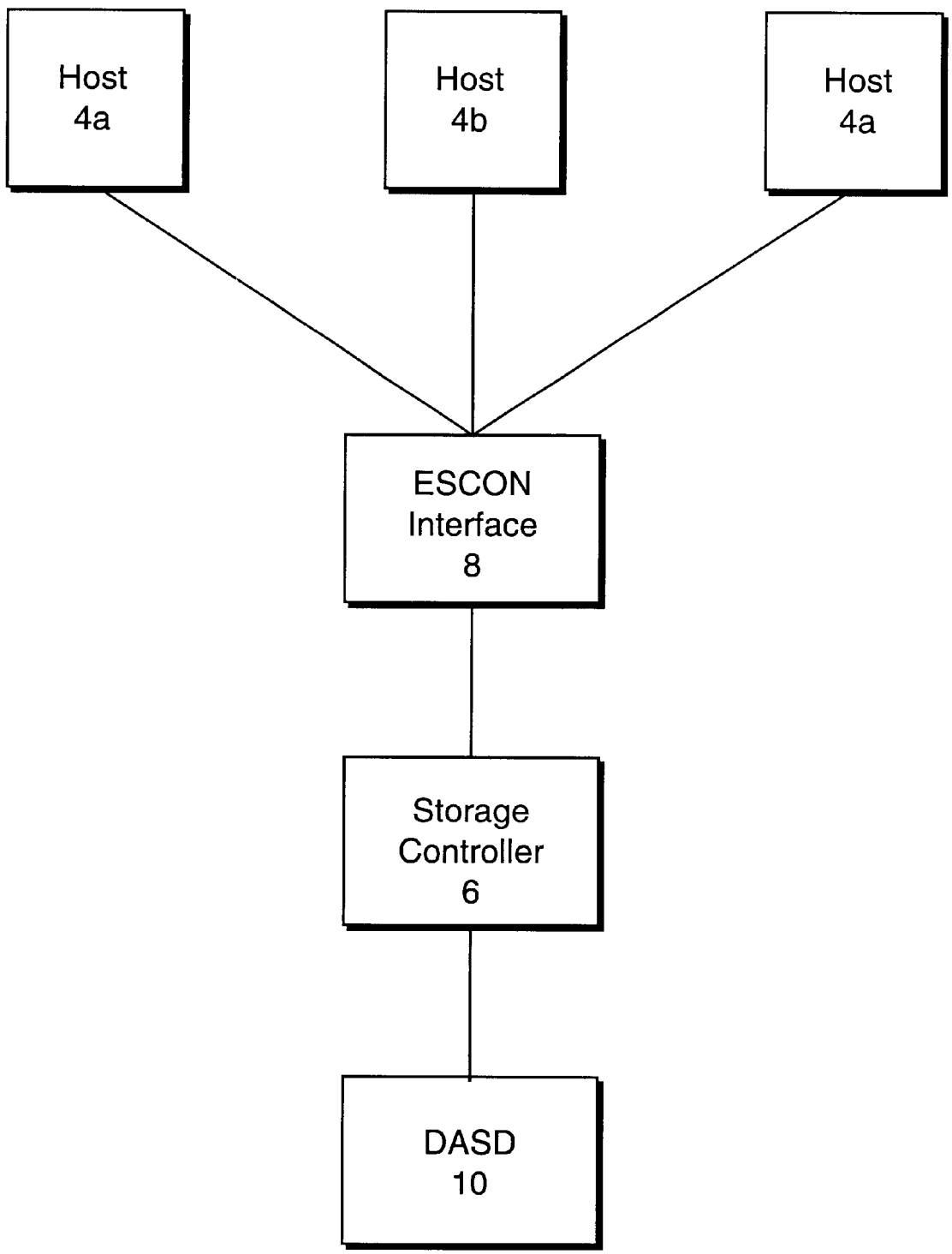
FIG. 1 is a block diagram illustrating an input/output (I/O) processing system as known in the prior art.
Figure 2:
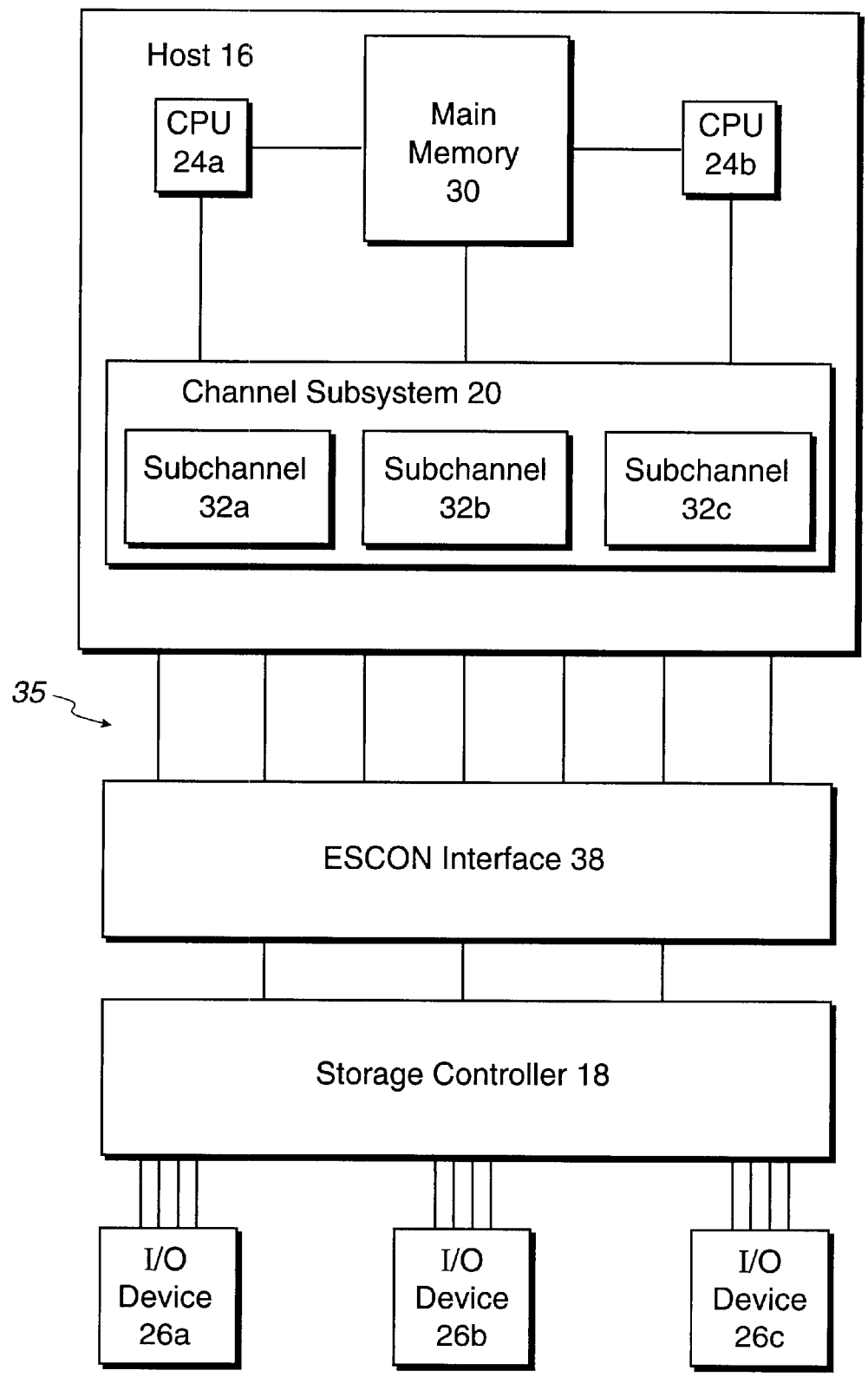
FIG. 2 illustrates an architecture of an I/O processing system in which preferred embodiments are implemented.

FIG. 2 illustrates a preferred hardware and software architecture environment in which preferred embodiments are implemented. A host system 16 is in communication with a storage controller 18. The host system 16 views the storage controller 18 as a channel subsystem 20 that interfaces the CPUs 24a, b in the host 16 with I/O devices 26a, b, c. The host 16 may have more than the two CPUs 24a, b shown in FIG. 2. Moreover, in preferred embodiments the CPUs 24a, b are capable of multi-tasking and each CPU 24a, b can simultaneously issue parallel execution paths. The channel subsystem 20 is the host 16 view of paths to the I/O devices 26a, b, c as represented by subchannels 32a, b, c. The host 16 would execute channel commands to manage the operation of the I/O devices 26a, b, c. Each I/O device 26a, b, c may be a particular volume of a direct access storage device (DASD). The storage controller 18 controls access to the I/O devices 26a, b, c. The host system 16 may view the storage controller 18 as a multitude of separate control unit images or logical subsystems (LSSs), wherein each control unit image provides access to one or more I/O devices 26a, b, c. In alternative embodiments, there may actually be multiple storage controllers providing communication with different I/O devices 26a, b, c. The channel subsystem 20, which may be a construct maintained in the main memory 30 of the host 16, includes subchannels 32a, b, c that execute operations for the channel subsystem 20. Channel paths 35 provide data communication between the host 16 and storage controller 18. Further details of the channel subsystem and interaction with the storage controller 18 are described in the commonly assigned and co-pending patent applications: "Method And System For Dynamically Assigning Addresses To An Input/ Output Device," by Brent C. Beardsley, Allan S. Merritt, Michael A. Paulsen, and Harry M. Yudenfriend, filed on Oct. 7, 1998, and having U.S. Pat. Ser. No. 09/167,782; and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, filed on Oct. 7, 1998, and having U.S. Pat. Ser. No. 09/168,017, which patent applications are incorporated herein by reference in their entirety.

Preferred embodiments, further include an ESCON interface 38 that provides the communication links between the channels 35 of the host 16 and the storage controller 18. The ESCON interface 38 may be a dynamic switch that provides a switched point-to-point configuration which connects each channel 35 to a port in the interface 38 to allow any one of the channels to form a link with a control unit image, which represents a LSS or I/O device 26a, b, c to the host 16. Sharing among the channels 35 and storage controller 18 through a dynamic switch means that communication with the storage controller 18 can take place over one link interface in the case where the storage controller 18 has only one link to the ESCON interface 38 dynamic switch or over multiple link interfaces in the case where the storage controller 18 has more than one link to the dynamic switch. Multiple connections from the storage controller 18 to the ESCON interface 38 allows multiple channels to communicate with different I/O devices 26a, b, c, or LSSs managed by the storage controller 18. In alternative embodiments, interface protocols and hardware interfaces 10 other than the ESCON interface may be utilized as the interface 38.

The ESCON interface 38 establishes a link between a channel path 35 port and storage controller 18 port to provide two points of attachment, one at each end of the link. If a storage controller 18, or storage controller 18 image, attempts to send a message to a channel 35 already connected via another link with the storage controller 18, then the ESCON interface 38 returns a switch busy signal to the storage controller 18 requesting a link. In a dynamic path system, the ESCON interface 38 would also send such a switch busy signal where there are no available ports to connect any channel 35 with the storage controller 18. Further details of how the ESCON interface 38 may link channel paths 35 and the storage controller 18 are described in the IBM publication "ESCON I/O Interface," which was incorporated herein by reference above.

Contention Handling

When communicating status to the host 16, the storage controller 18 may indicate device end or control unit end in the status byte of the message communicated to the host 16. The storage controller 18 communicates device end when attempting to reconnect to the channel 35 to indicate the completion of the previously transmitted I/O operation, such as retrieving requested data. As discussed, the channel path 35 may disconnect from the storage controller 18 at the completion of the channel portion of the I/O operation and before the storage controller 18 completes its portion of the I/O operations, e.g., retrieving requested data. The storage controller 18 may transmit a busy status to a channel 35 to preclude execution of an I/O operation initiated from the host 16 channels 35. The storage controller 18 returns a control unit end status to the host 16 after the control unit busy condition no longer exists, i.e., a no-longer-busy status, to allow the host 16 to proceed with the I/O operation interrupted by the previous busy status. A channel 35 may continue to transmit I/O operations to the storage controller 18 after receiving a busy message, and may receive additional busy messages from the storage controller 18. Thus, a pending control-unit end does not necessarily preclude initiation of new operations. The storage controller 18 determines whether to allow initiation of new operations. However, only one control-unit-end indication is returned on a logical path, regardless of the number of times the channel accepted control-unit-busy status on that logical path during the busy period.

Figure 3:
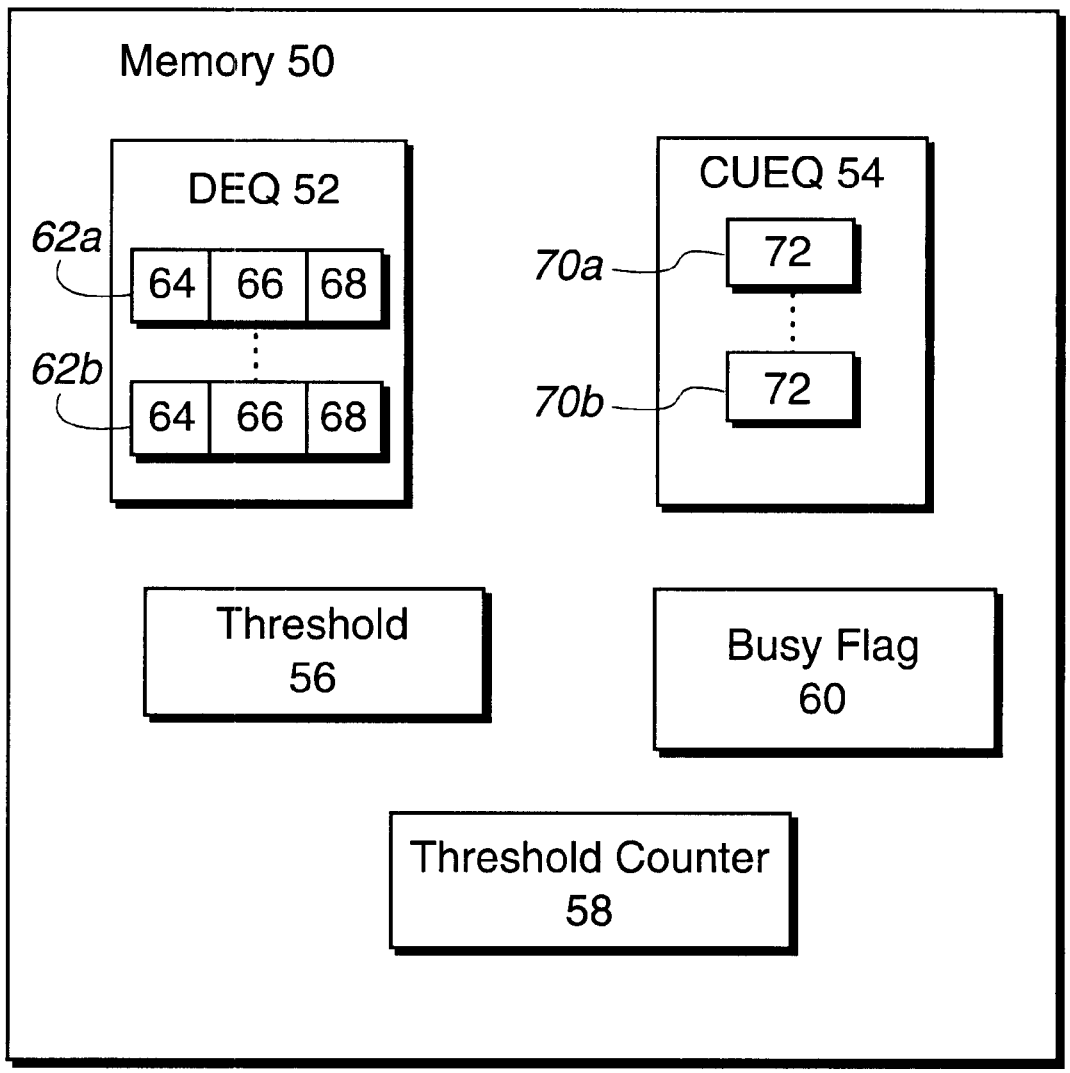
FIG. 3 illustrates data structures maintained by a storage controller in accordance with preferred embodiments of the present invention.

FIG. 3 illustrates data structures the storage controller 18 maintains in a memory 50, which is preferably a volatile memory the storage controller 18 accesses to maintain information. A device end queue (DEQ) 52 is a linked list of entries 62a, b indicating reconnect operations to a channel 35 to present device end status that failed as a result of the ESCON interface 38 or channel 35 being busy. In preferred embodiments, each entry 62a, b in the DEQ 52 includes three fields 64, 66, and 68. A device number 64 field indicates the I/O device 26a, b, c that was the target of the host 16 request which resulted in the failed reconnect attempt by the storage controller 18 to provide status. A logical path field 66 indicates the host 16 path 35 to which the storage controller 18 was attempting to reconnect to provide status. A status field 68 indicates the status the storage controller 18 was attempting to present, e.g., channel end and device end status.

A control unit end queue (CUEQ) 54 is a linked list of entries 70a, b indicating busy status messages the storage controller 18 previously presented to the host system 16 to inhibit a transmitted I/O operation. In preferred embodiments, each entry 70a, b in the CUEQ 54 includes a logical path field 72 indicating the logical path, e.g., channel path 35, to which the storage controller 18 should present control unit end status to indicate the end of the busy status previously presented. A threshold value 56 is a predetermined value that indicates the maximum number of failed reconnects that must occur before the storage controller 18 returns busy to channels 35 initiating new I/O operations. The storage controller 18 returns busy to reduce I/O traffic between the host system 16 and the storage controller 18 in order to make channels paths and links available for use in reconnecting to the channel 35 to return device end status. The threshold value 56 may be maintained in non-volatile storage for the storage controller 18 and loaded into the memory 50 for use during I/O operations. For instance, with two or three attached host systems 16, the threshold value 56 may be set between 100 and 200. A threshold counter 58 is used to count the number of failed reconnects that have occurred as result of a busy condition at the channels 35 in the host 16 or at the ESCON interface 38. A busy flag 60 is a flag that is set to "on" to signal the storage controller 18 to return busy to any new I/Os operations initiated from the channels 35 in the host 16. If the busy flag 58 is set to "off," which is the default position, then the storage controller 18 will accept I/O operations from the host 16.

Figures 4, 5:
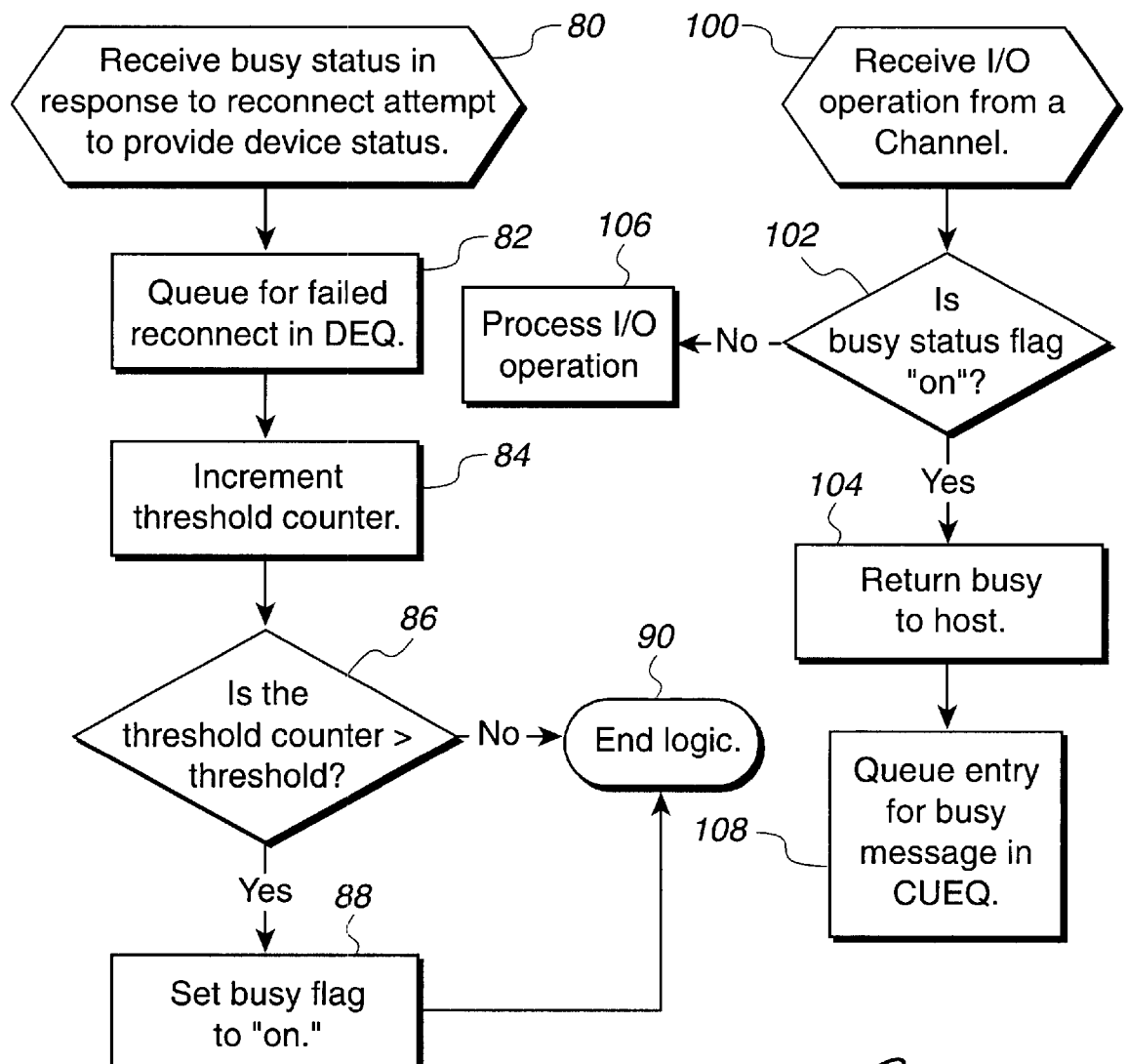
FIG. 4 illustrates logic to process busy status message returned in response to a reconnection operation in accordance with preferred embodiments of the present invention.
FIG. 5 illustrate logic to process newly initiated I/O operations in accordance with preferred embodiments of the present invention.
Figure 6:
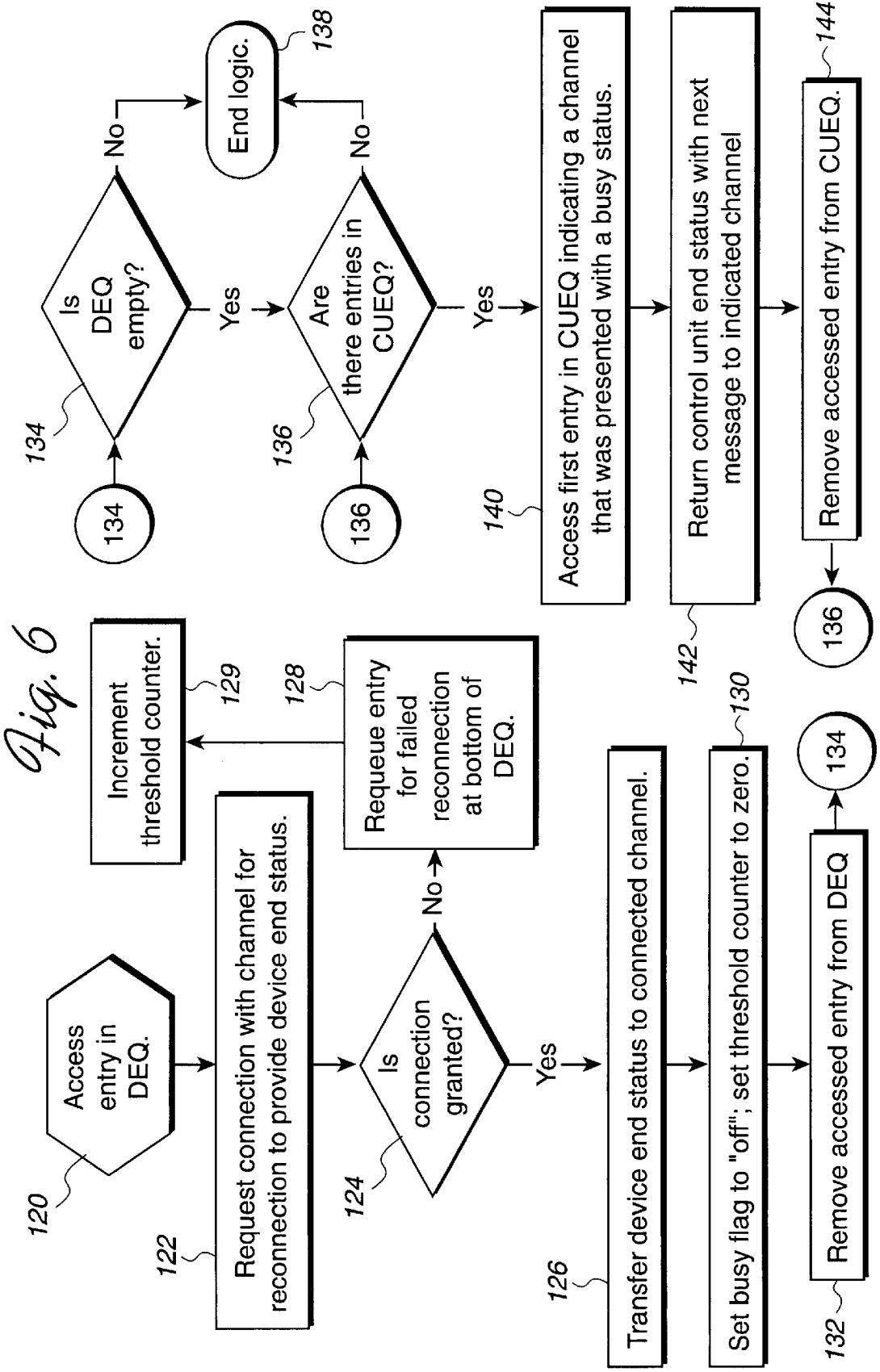
FIG. 6 illustrates logic to process previously failed reconnection operations in accordance with preferred embodiments of the present invention.

FIGS. 4, 5, and 6 illustrate logic implemented in the storage controller 18 to manage I/O operations to make channels 35 available for the storage controller 18 to reconnect to the host 16 to present device end status to complete I/O operations previously initiated from the host 16. FIG. 4 illustrates logic for the storage controller 18 to process a busy status presented by the ESCON interface 38 or host 16 in response to requesting a connection to reconnect to present device end status indicating completion of the I/O operation. At block 80, the storage controller 18 receives the busy status in response to a previously transmitted connection request to reconnect to complete the previously disconnected I/O operation. The storage controller 18 queues (at block 82) an entry 62a, b in the DEQ 52 indicating the device number 64, i.e., I/O device 26a, b, c, logical path 66, e.g., channel path 35, and status 66 for the reconnection operation the storage controller 18 was attempting. In preferred embodiments, the storage controller 18 stacks entries at the bottom of the DEQ 52 linked list and pulls entries off the top. The storage controller 18 then increments (at block 84) the threshold counter 58. The storage controller 18 then determines (at block 86) whether the threshold counter 58 is greater than the threshold value 56. If so, the storage controller 18 sets (at block 88) the busy flag 60 to "on." Otherwise, if the threshold counter 58 has not reached the threshold 56, then the routine ends (at block 90). As discussed, setting the busy flag 60 to "on" signals the storage controller 18 to return busy to any further I/O operations in order to free up resources to allow the storage controller 18 to reconnect on previously disconnected I/O operations.

FIG. 5 illustrates logic the storage controller 18 executes to process an I/O operation received from a host 16 channel 35. At block 100, the storage controller 18 receives an I/O operation from the host 16. The storage controller 18 determines whether the busy flag 60 is "on". If so, the storage controller 18 returns (at block 104) busy to the host 16 initiating the I/O operation. Otherwise, if the busy flag 60 is "off," the storage controller 18 accepts (at block 106) the I/O operation to process. After returning busy to the host 16 (at block 104), the storage controller 18 generates and queues in the CUEQ 54 (at block 108) an entry 70a, b indicating the channel 35 on which busy was returned. When the busy condition clears, the storage controller 18 would return busy end status on the same channel 35, indicated in the logical path field 72, on which busy was presented. Thus, after the threshold 56 number of reconnects have failed (wherein there is a queued entry 62a, b in the DEQ 52 for each failed reconnect), the storage controller 18 will return busy to any new I/O operations from any connected hosts 16. This will reduce host I/O traffic to free available channels and ESCON interface 38 ports to allow the storage controller 18 to reconnect to the host 16 to complete the previously disconnected I/O operations.

FIG. 6 illustrates logic the storage controller 18 executes to process queued entries 62a, b in the DEQ 52 to retry a failed reconnect operation. At block 120, the storage controller 18 accesses the entry 62a at the top of the DEQ 52. In preferred embodiments, new entries are inserted at the bottom of the DEQ 52 list, thereby pushing older entries toward the top of the queue. Those skilled in the art will recognize that alternative methods may be used to stack or queue entries in the DEQ 52 or CUEQ 54. The storage controller 18 may access an entry 62a, b from the DEQ 52 at predetermined time intervals to insure a minimum time delay between reconnect attempts. After accessing an entry 62a, the storage controller 18 attempts (at block 122) to reconnect the disconnected I/O operation on the I/O device 26a, b, c indicated in the device field 64 on the channel 35 indicated in the logical path field 66 with the status indicated in the status field 66. The storage controller 18 determines (at block 124) whether a response from the channel 35 indicates that the connection is granted. If so, the storage controller 18 transfers (at block 126) the status, e.g., device end status, indicated in the status field 66 to the connected channel 35 indicated in the channel field 66. After transferring device end status (at block 126), the storage controller 18 sets the busy flag 60 to "off" and the threshold counter 58 to zero, and removes (at block 132) the accessed entry 62a from the DEQ 52. If, at block 124, the connection was not granted, then the storage controller 18 requeues (at block 128) the accessed entry 62a in the DEQ 52 to retry again later. As discussed, entries are queued and requeued at the bottom of the queue. The storage controller then increments (at block 129) the threshold counter 58 indicating a failed reconnect attempt.

In this way, after successfully completing the first reconnection in the DEQ 52, the storage controller 18 stops sending busy signals to subsequent I/O operations. In alternative embodiments, the storage controller 18 may decrement the threshold counter 58, instead of resetting the counter to zero in order, to send busy signals should the next reconnect fail. Those skilled in the art will recognize that modifications may be made to the threshold value 56 and the manner in which the threshold counter 58 is decremented and incremented to control the frequency at which busy signals are returned. Such threshold values may be set and adjusted by a systems administrator depending on the number of connected hosts and I/O traffic rate in the system.

After removing (at block 132) the accessed entry 62a from the DEQ 52, the storage controller 18 determines whether the DEQ 52 is empty (at block 136), i.e., device end status has been successfully presented for all previously failed reconnect operations. If so, the storage controller 18 processes (at block 140) entries 70a, b for the CUEQ 54. Otherwise, if there are further failed reconnections in the DEQ 52, the routine ends (at block 138). If (at block 136) there are entries in the CUEQ 54, then the storage controller 18 accesses (at block 140) the first entry 70a indicating a host 16 channel 35 that was previously presented with busy status when the busy flag 60 was set "on". Otherwise, if there are no entries, the routine ends (at block 138). After accessing the first entry 70a in the CUEQ 54, the storage controller 18 returns (at block 142) control unit end status with the next message to the channel 35 indicated in the logical path field 72 to indicate that the busy status and condition has ended and that the host channel 35 may proceed with I/O operations which were suspended in response to the busy signal. The storage controller 18 then removes (at block 144) the accessed entry 70a from the CUEQ 54 and returns (at block 136) to process any additional CUEQ entries to return further control unit end status.

With the preferred logic of FIGS. 4, 5, and 6, the storage controller 18 does not end the busy status for I/O operations on any channel 35 by returning control unit end until all failed reconnects have been successfully processed. By returning busy signals, the storage controller 18 reduces I/O traffic and makes channel and ESCON interface 38 resources available for reconnection to allow the storage controller 18 to complete failed reconnect operations pending in the DEQ 52.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to handling failed reconnect attempts. However, the preferred logic may apply to any type of failed connection when the storage controller fails to connect with a channel path, not just failed reconnect operations to provide status on a disconnected I/O operation. In such case, information on the failed connection would be placed in the DEQ 52 for processing.

Preferred embodiments were described as implemented in a mainframe operating system, such as the IBM ESA/390 system, and the IBM 3990 Storage Controller where specific commands, such as control unit end, device end, etc., are involved when the storage controller attempts to reconnect to the I/O operation.

However, those skilled in the art will appreciate that the data structures and logic of FIGS. 4, 5, and 6 to reduce I/O traffic could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The host 16 may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 18.

Preferred embodiments were described with respect to a host system that communicates with a channel subsystem, which in turn communicates via channel paths and an ESCON interface, to control units, which access the I/O devices. In alternative embodiments, the data paths may extend from the channel subsystem directly to the I/O device or, alternatively, from the host system directly to the I/O device without the intervention of the channel subsystem and subchannel constructs.

The logic of FIGS. 4, 5, and 6, described with respect to the flowcharts, may be implemented in programmable gate arrays, such as a filled programmable gate array (FPGA) or complex programmable logic device (CPLD). In this way, the logic may be updated or reconfigured from files maintained in a non-volatile memory device that is part of the storage controller 18. These files including the code needed to configure the logic may be retrieved from over a network or from a provided memory device, such as a CD-ROM. Such readily programmable logic is especially useful for the initial introduction of a product where updates and fixes may need to be provided. Alternative embodiments may be implemented in non-programmable logic, such as application specific integrated circuits (ASICs), which are typically less expensive than the programmable logic devices.

Preferred embodiments were described with respect to specific data structures for the DEQ 52, CUEQ 54, and queued entries 62a, b and 70a, b. Those skilled in the art will appreciate that alternative data structures having different formats may be used to implement the queues and entries in the queue in accordance with the preferred logic.

In summary, preferred embodiments disclose a system, method, and program for managing I/O operations transmitted from a computer system to a processing unit. The processing unit manages access to a storage device and executes the I/O operation against the storage device. The processing unit receives indication that a request to connect between the processing unit and the computer system failed. Upon receiving a subsequent I/O operation from the computer system after receiving indication that the connect request failed, the processing unit returns busy to the computer system initiating the subsequent I/O operation in response to receiving indication that the connect request failed. The connect request is retried after returning busy.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for managing I/O operations transmitted from a computer system to a processing unit that manages access to a storage device, wherein the I/O operation is executed against the storage device, comprising:

receiving indication that a request to connect between the processing unit and the computer system failed;

receiving a subsequent I/O operation after receiving indication that the connect request failed;

returning busy to the computer system initiating the subsequent I/O operation in response to receiving indication that the connect request failed; and retrying the connect request after returning busy.

2. The method of claim 1, further comprising:

indicating a busy condition after receiving indication that the connect request failed; and determining whether the busy condition is indicated after receiving subsequent I/O operations, wherein busy is returned to the computer system initiating the subsequent I/O operations after determining that the busy condition is indicated.

3. The method of claim 2, further comprising:

indicating a non-busy condition after succeeding in retrying the failed connect request;

receiving subsequent I/O operations after indicating a non-busy condition;

determining whether the non-busy condition is indicated after receiving an I/O operation; and accepting subsequent I/O operations after determining that the non-busy condition is indicated.

4. The method of claim 1, further comprising:

queuing information on the failed connect request in a first queue after receiving indication that the connect request failed;

queuing information on the busy returned to the I/O operation in a second queue;

accessing information on a failed connect request from the first queue;

retrying the accessed failed connect request;

determining whether the retried connect request succeeded; and returning a busy end status to the computer system after determining that the retried connect request succeeded, wherein the computer system retries the subsequent I/O operation which was suspended as a result of the failed connect request.

5. The method of claim 4, further comprising:

incrementing a counter after queuing information on the failed connect request in the first queue; and determining whether the counter exceeds a predetermined value before returning busy to the computer system initiating the subsequent I/O operation, wherein busy is returned to the computer system initiating the subsequent I/O operation if the counter exceeds the predetermined value.

6. The method of claim 5, further comprising indicating a busy condition after determining that the counter exceeds the predetermined value, wherein busy is returned to subsequent I/O operations if the busy condition is indicated.

7. The method of claim 6, further comprising reducing the counter and indicating a non-busy condition after determining that the retried connect request succeeded, wherein busy is not returned to subsequent I/O operations when the non-busy condition is indicated.

8. The method of claim 4, wherein the busy end status is returned after all request connects in the first queue have been successfully retried.

9. The method of claim 1, wherein the computer system and processing unit disconnect after the processing unit receives an I/O operation and the processing unit reconnects with the computer system to present status on the disconnected I/O operation after processing the disconnected I/O operation, wherein the failed connect requests queued in the first queue are requests by the processing unit to reconnect to the system to present status to the system on previously disconnected I/O operations.

10. A system managing I/O operations between a computer system and a storage device, wherein the I/O operation is executed against the storage device, comprising:
- a processing unit controlling access to the storage device and in communication with the computer system;
- control logic executed by the processing unit, comprising:
  - (i) means for receiving indication that a request to connect between the processing unit and the computer system failed;
  - (ii) means for receiving a subsequent I/O operation after receiving indication that the connect request failed;
  - (iii) means for returning busy to the computer system initiating the subsequent I/O operation in response to receiving indication that the connect request failed; and
  - (iv) means for retrying the connect request after returning busy.

11. The system of claim 10, further comprising a memory accessible to the processing unit, wherein the control logic further comprises:
- means for indicating a busy condition in the memory after receiving indication that the connect request failed; and
- means for determining whether the busy condition is indicated in the memory after receiving subsequent I/O operations, wherein busy is returned to the computer system initiating the subsequent I/O operation after determining that the busy condition is indicated.

12. The system of claim 11, wherein the control logic further comprises:
- means for indicating a non-busy condition in the memory after succeeding in retrying the failed connect request; and
- means for receiving subsequent I/O operations from the computer system after indicating a non-busy condition in the memory;
- means for determining whether the non-busy condition is indicated after receiving an I/O operation; and
- means for accepting subsequent I/O operations from the computer system after determining that the non-busy condition is indicated.

13. The system of claim 10, wherein the memory includes a first queue and a second queue, and wherein the control logic further comprises:
- means for queuing information on the failed connect request in the first queue after receiving indication that the connect request failed;
- means for queuing information on the busy returned to the I/O operation in the second queue;
- means for accessing information on a failed connect request from the first queue;
- means for retrying the accessed failed connect request;
- means for determining whether the retried connect request succeeded; and
- means for returning a busy end status to the computer system after determining that the retried connect request succeeded, wherein the computer system retries the subsequent I/O operation for which the busy was received.

14. The system of claim 13, wherein the memory further includes a counter, and wherein the control logic further comprises:
- means for incrementing the counter in the memory after queuing information on the failed connect request in the first queue; and
- means for determining whether the counter exceeds a predetermined value before returning busy to the subsequent I/O operation, wherein busy is returned to subsequent I/O operations if the counter exceeds the predetermined value.

15. The system of claim 14, further comprising indicating a busy condition in the memory after determining that the counter exceeds the predetermined value, wherein busy is returned to subsequent I/O operations if the busy condition is indicated.

16. The system of claim 15, further comprising reducing the counter and indicating a non-busy condition in the memory after determining that the retried connect request succeeded, wherein busy is not returned to subsequent I/O operations when the non-busy condition is indicated.

17. The system of claim 13, wherein the busy end status is returned to the computer system after all request connects in the first queue have been successfully retried.

18. The system of claim 10, wherein the processing unit and the computer system disconnect after the processing unit receives an I/O operation and the processing unit reconnects with the system to present status on the disconnected I/O operation after processing the disconnected I/O operation, wherein the failed connect requests queued in the first queue are requests by the processing unit to reconnect to the system to present status to the system on previously disconnected I/O operations.

19. The system of claim 18, wherein the computer system is a host system including a plurality of channels to communicate I/O operations to the processing unit, wherein the reconnection attempt fails if the processing unit cannot connect to the host system via one of the channels.

20. The system of claim 18, further comprising an interface providing links between the processing unit and the channels in the host system, wherein the reconnection attempt fails if the interface cannot provide a link between the processing unit and the channels in the host system.

21. A system for managing I/O operations transmitted from a computer system, comprising:
- a storage device, wherein the I/O operation is executed against the storage device;
- a processing unit controlling access to the storage device and in communication with the computer system; and
- control logic executed by the processing unit, comprising:
  - (i) means for receiving indication that a request to connect between the processing unit and the computer system failed;
  - (ii) means for receiving a subsequent I/O operation after receiving indication that the connect request failed;
  - (iii) means for returning busy to the computer system initiating the subsequent I/O operation in response to receiving indication that the connect request failed; and
  - (iv) means for retrying the connect request after returning busy.

22. The system of claim 21, further comprising a memory accessible to the processing unit, wherein the control logic further comprises:
- means for indicating a busy condition in the memory after receiving indication that the connect request failed; and
- means for determining whether the busy condition is indicated in the memory after receiving subsequent I/O operations, wherein busy is returned to the computer system initiating the subsequent I/O operations after determining that the busy condition is indicated.

23. The system of claim 21, wherein the memory includes a first queue and a second queue, and wherein the control logic further comprises:

means for queuing information on the failed connect request in the first queue after receiving indication that the connect request failed;

means for queuing information on the busy returned to the I/O operation in the second queue; and means for accessing information on a failed connect request from the first queue;

means for retrying the accessed failed connect request;

means for determining whether the retried connect request succeeded; and means for returning a busy end status to the computer system after determining that the retried connect request succeeded, wherein the computer system retries the subsequent I/O operation for which the busy was received.

24. The system of claim 22, wherein the memory further includes a counter, and wherein the control logic further comprises:

means for incrementing the counter in the memory after queuing information on the failed connect request in the first queue; and means for determining whether the counter exceeds a predetermined value before returning busy to the computer system initiating the subsequent I/O operation, wherein busy is returned to the computer system initiating the subsequent I/O operations if the counter exceeds the predetermined value.

25. An article of manufacture for use in programming a processing unit to manage I/O operations transmitted from a computer system to execute against a storage device managed by the processing unit, the article of manufacture comprising computer readable storage media including at least one computer program embedded therein that causes the processing unit to perform:

receiving indication that a request to connect between the processing unit and system failed;

receiving a subsequent I/O operation after receiving indication that the connect request failed;

returning busy to the subsequent I/O operation in response to receiving indication that the connect request failed; and retrying the connect request after returning busy.

26. The article of manufacture of claim 25, further causing the processing unit to perform:

indicating a busy condition after receiving indication that the connect request failed; and determining whether the busy condition is indicated after receiving subsequent I/O operations, wherein busy is returned to the subsequent I/O operations after determining that the busy condition is indicated.

27. The article of manufacture of claim 26, further causing the processing unit to perform:

indicating a non-busy condition after succeeding in retrying the failed connect request;

receiving subsequent I/O operations after indicating a non-busy condition;

determining whether the non-busy condition is indicated after receiving an I/O operation; and accepting subsequent I/O operations after determining that the non-busy condition is indicated.

28. The article of manufacture of claim 25, further causing the processing unit to perform:

queuing information on the failed connect request in a first queue after receiving indication that the connect request failed;

queuing information on the busy returned to the I/O operation in a second queue; and accessing information on a failed connect request from the first queue;

retrying the accessed failed connect request;

determining whether the retried connect request succeeded;

returning a busy end status to the computer system after determining that the retried connect request succeeded, wherein the computer system retries the subsequent I/O operation for which the busy was received.

29. The article of manufacture of claim 28, further causing the processing unit to perform:

incrementing a counter after queuing information on the failed connect request in the first queue; and determining whether the counter exceeds a predetermined value before returning busy to the subsequent I/O operation, wherein busy is returned to subsequent I/O operations if the counter exceeds the predetermined value.

30. The article of manufacture of claim 29, further causing the processing unit to indicate a busy condition after determining that the counter exceeds the predetermined value, wherein busy is returned to subsequent I/O operations if the busy condition is indicated.

31. The article of manufacture of claim 30, further causing the processing unit to perform reducing the counter and indicating a non-busy condition after determining that the retried connect request succeeded, wherein busy is not returned to subsequent I/O operations when the non-busy condition is indicated.

32. The article of manufacture of claim 25, wherein the busy end status is returned after all request connects in the first queue have been successfully retried.

33. The article of manufacture of claim 25, wherein the computer system and processing unit disconnect after the processing unit receives an I/O operation and the processing unit reconnects with the computer system to present status on the disconnected I/O operation after processing the disconnected I/O operation, wherein the failed connect requests queued in the first queue are requests by the processing unit to reconnect to the system to present status to the system on previously disconnected I/O operations.

* * * * *

UNITED STATES PATENT AND TRADEMARK OFFICE
CERTIFICATE OF CORRECTION

PATENT NO. : 6,349,350 B1 Page 1 of 1
DATED : February 19, 2002
INVENTOR(S) : Roger Gregory Hathorn, Bret Wayne Holley and James Lincoln Iskiyan It is certified that error appears in the above-identified patent and that said Letters Patent is hereby corrected as shown below:

Column 10,
Line 22, "accepting subsequent I/O...indicated." should be a new paragraph.

Signed and Sealed this

Ninth Day of November, 2004

JON W. DUDAS
*Director of the United States Patent and Trademark Office*